United States Patent [19]

Kim

[11] Patent Number: 5,581,426
[45] Date of Patent: Dec. 3, 1996

[54] UPPER HEAD DRUM ASSEMBLY INCLUDING AT LEAST ONE NUT CAP

[75] Inventor: Keum-Mo Kim, Seoul, Rep. of Korea

[73] Assignee: Daewoo Electronics, Co., Ltd., Seoul, Rep. of Korea

[21] Appl. No.: 540,783

[22] Filed: Oct. 11, 1995

[30] Foreign Application Priority Data

Dec. 27, 1994 [KR] Rep. of Korea ............... 94-36238

[51] Int. Cl.$^6$ .................... G11B 5/52; G11B 5/56
[52] U.S. Cl. ...................... 360/109; 360/130.24
[58] Field of Search ................. 360/75, 76, 84, 360/85, 104, 107, 109, 130.21–130.24

[56] References Cited

U.S. PATENT DOCUMENTS

| | | | |
|---|---|---|---|
| 4,672,489 | 6/1987 | Wada et al. | 360/104 |
| 4,709,287 | 11/1987 | Yamashita | 360/109 |
| 4,768,117 | 8/1988 | Mihara | 360/109 |
| 4,897,745 | 1/1990 | Binder-Kriegelstein | 360/109 |
| 5,050,024 | 9/1991 | Nanjyo | 360/109 |
| 5,317,466 | 5/1994 | Hasegawa | 360/130.24 |
| 5,392,180 | 2/1995 | Hasegawa | 360/107 |

FOREIGN PATENT DOCUMENTS

| | | | |
|---|---|---|---|
| 5-174343 | 7/1993 | Japan | 360/109 |
| 6-131642 | 5/1994 | Japan | 360/109 |

*Primary Examiner*—Jefferson Evans
*Attorney, Agent, or Firm*—Pennie & Edmonds

[57] ABSTRACT

An upper drum assembly for use in a video cassette recorder includes an upper drum having an inner part with a top surface and an outer side surface with one or more head windows, the inner part thereof being provided with recesses, one or more openings and one or more through holes, one or more heads, the head having a head chip joined to a head base, one or more first screws, one or more second screws and one or more nut caps, each of the nut caps having a fixed part provided with a first tapped hole corresponding to the through hole in the upper drum, a body part provided with a second tapped hole, and a stepped part. Each of the nut caps is fitted onto the upper drum in such a way that the body part therein is fitted into one of the openings, the fixed part therein is placed on the top surface of the inner part of the upper drum, and the stepped part is placed into the corresponding recess. One of the first screws is fastened from bottom up through one of the first tapped holes in the nut cap and one of the through holes in the upper drum to securely fasten each of the heads onto the upper drum, and each of the second screw is fastened from top down through the one of the second tapped holes from the nut cap to precisely adjust the vertical position of each of the head chips.

2 Claims, 4 Drawing Sheets

UPPER HEAD DRUM ASSEMBLY INCLUDING AT LEAST ONE NUT CAP

FIELD OF THE INVENTION

The present invention relates to a head drum assembly for use in a video cassette recorder; and, more particularly, to an upper head drum assembly in which one or more heads are securely and precisely fastened to an upper drum therein.

BACKGROUND OF THE INVENTION

As is shown in FIG. 1, a conventional head drum assembly 100 for use in a video cassette recorder comprises a rotating shaft 1 divided into an upper and a lower parts, an upper head drum assembly 101 and a lower head drum assembly 102. The upper head drum assembly 101 includes an upper drum 2 with an inner part 2A and an outer side surface 2B, the outer side surface 2B being provided with a pair of head windows (not shown) having a predetermined width, a flange 3, a pair of heads 4, each of the heads having a head chip 4B adjoined to a head base 4A, and a rotor transformer 5. The inner part 2A of the upper drum 2 is provided with a top and a bottom surfaces 2A-1, 2A-2. The lower head drum assembly 102 includes a stator transformer 6, a lower drum 7 and two sets of bearings 8.

The upper drum 2 is joined with the upper part of the rotating shaft 1 via the flange 3; and the lower drum 7 is attached to the lower part of the rotating shaft 1 through the two sets of bearings 8.

The rotor transformer 5 may be attached at bottom of the flange 3 using, e.g., a bonding agent. The stator transformer 6 for producing a predetermined electric signal, on the other hand, may be fixed on the lower drum 7 using, e.g., a bonding agent, at a predetermined distance from the rotor transformer 5.

The upper drum 2 is provided with a first and a second pairs of tapped holes, each of the tapped holes from the first pair extending upward from the bottom surface 2A-2 of the inner part 2A thereof and each of the tapped holes from the second pair extending downward from the top surface 2A-1 of the inner part 2A thereof. Furthermore, each of the first pair of tapped holes has a first screw (S); and, likewise, each of the second pair of tapped holes has a second screw(S').

The heads 4 are secured to the bottom surface 2A-2 of the inner part 2A of the upper drum 2 by using the first screws (S) and the first pair of tapped holes in such a way that the head chips 4B from each of the heads 4 protrude past the outer side surface 2B of the upper drum 2 through the head windows. Vertical positions of the head chips 4B within the head drum assembly 100 are adjusted by using the second screws (S') in conjunction with the second pair of tapped holes.

In assembling the head drum assembly 100 shown in FIG. 1, each of the heads 4 is first fixed to the bottom surface 2A-2 of the inner part 2A of the upper drum 2 by using the first screw (S) and one of the first pair of tapped holes. Thereafter, the upper and the lower drums 2, 7 are assembled; and then the vertical positions of the head chips 4B within the head drum assembly 100 are adjusted using the second screws (S') and one of the second pair of tapped holes.

In such a head drum assembly, in order to securely fasten each of the heads 4 onto the bottom surface 2A-2 of the inner part 2A of the upper drum 2 and precisely adjust the vertical positions of the head chips 4B, each of the tapped holes from the first and the second pairs, and hence the screws, must be deep in length and wide in diameter.

However, the current trend in designing the upper drum is to make the inner part of the upper drum as thin as possible for the purpose of reducing the production cost thereof. When the inner part of the upper drum becomes too thin, however, tightening of the screws may cause a deformation of the inner part of the upper drum, making it difficult to securely fasten the heads to the bottom surface of the inner part of the upper drum and to precisely adjust the vertical positions of the head chips within the head drum assembly.

SUMMARY OF THE INVENTION

It is, therefore, a primary object of the invention to provide a head drum assembly for use in a video cassette recorder in which one or more heads are securely and precisely fastened to an upper drum therein.

In accordance with one aspect of the present invention, there is provided an upper drum assembly for use in a video cassette recorder, comprising a rotating shaft, a flange, one or more heads, each of the heads having a head chip adjoined to a head base, an upper drum adjoined to the rotating shaft via the flange and provided with an inner part having a top and a bottom surfaces, the inner part having one or more openings, one or more through holes, and one or more recesses on the bottom surface thereof, one or more nut caps, each of the nut caps including a fixed part provided with a first tapped hole to be aligned with one of the through holes in the upper drum, a body part provided with a second tapped hole and an outer side surface, and a stepped part, one or more first screws, each of the first screws matching the first tapped hole in the fixed part on one of the nut caps and one of the through holes on the inner part of the upper drum, and one or more second screws, each of the second screws matching the second tapped hole in the body part on one of the nut caps, wherein said head drum assembly is characterized in that: at least one of the heads is secured onto the bottom surface of the inner part of the upper drum with the vertical position of the corresponding head chip being precisely adjusted by fitting the body part in one of the nut caps into one of the openings on the inner part of the upper drum, placing the fixed part in the nut cap on the top surface of the inner part of the upper drum, fitting the stepped part in the nut cap into the corresponding recess on the bottom surface of the inner part of the upper drum, fastening one of the first screws upward from the bottom surface of the inner part of the upper drum through the first tapped hole of the fixed part in the nut cap and one of the through holes formed on the inner part of the upper drum, and fastening one of the second screws downward from the top surface of the body part on the nut cap through the second tapped hole thereon.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENT

Figure 1:
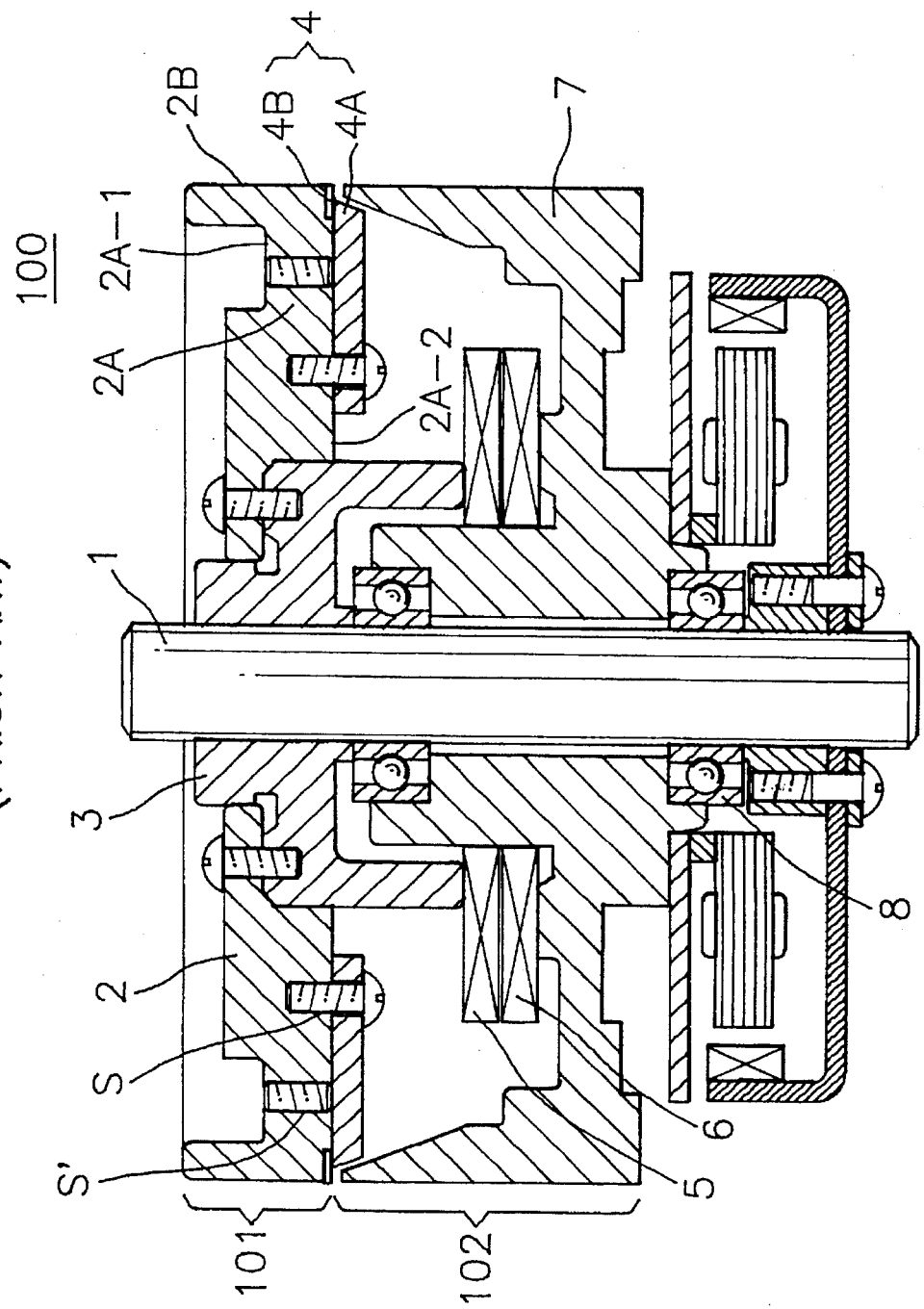
FIG. 1 shows a cross sectional view of the conventional head drum assembly.
Figure 2:
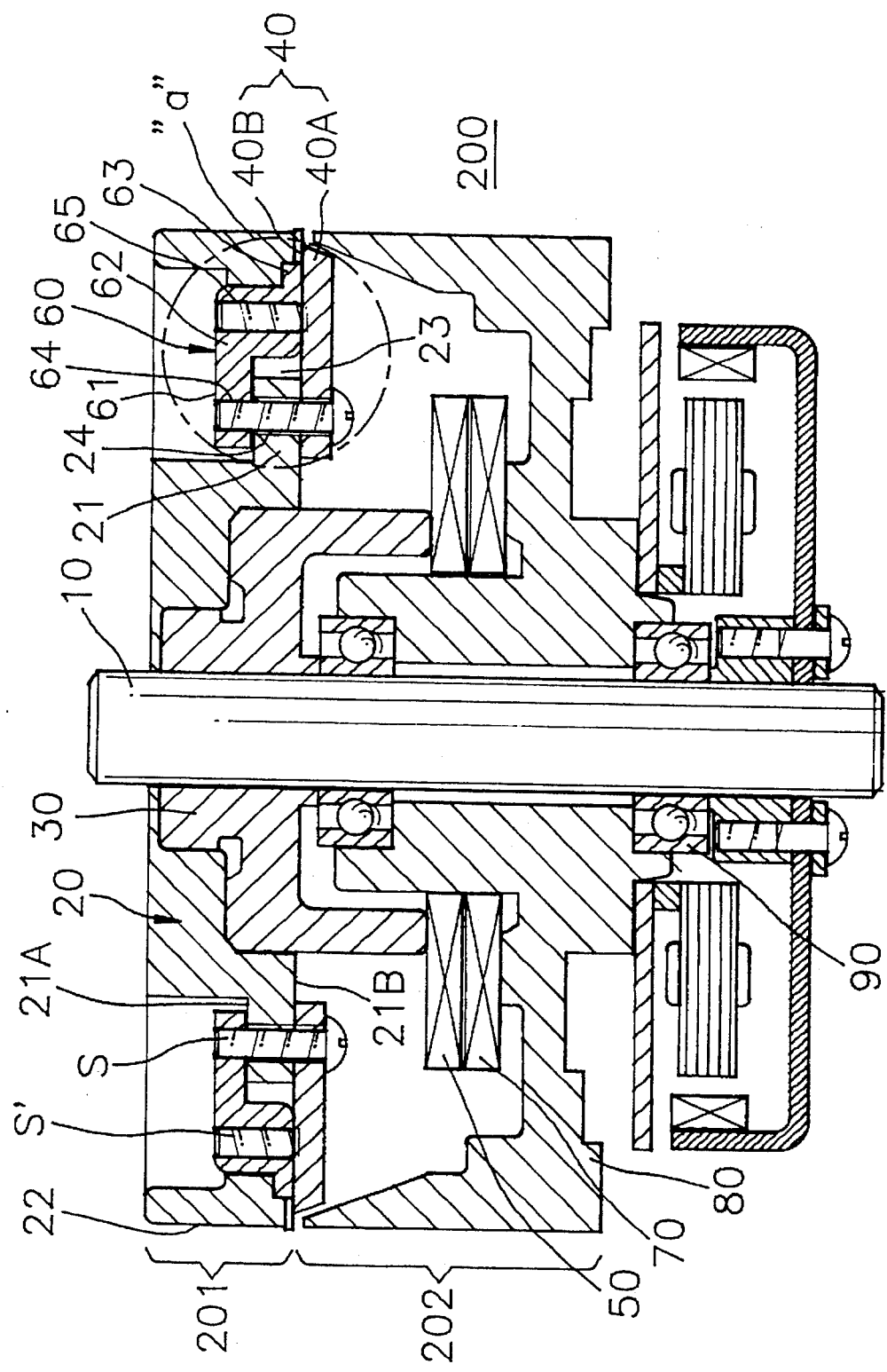
FIG. 2 presents a cross sectional view of the head drum assembly in accordance with the present invention.

Referring to FIG. 2, there is shown a cross sectional view of a head drum assembly 200 for use in a video cassette recorder incorporating therein an inventive upper head drum assembly 201. The head drum assembly 200 comprises a rotating shaft 10 divided into an upper and a lower parts, the inventive upper head drum assembly 201 and a lower head drum assembly 202. The upper head drum assembly 201 includes an upper drum 20 having an outer side surface 22 and a inner part 21 with a top and a bottom surfaces 21A, 21B, the outer side surface 22 being provided with one or more head windows (not shown) having a predetermined width, a flange 30, one or more heads 40, each of the heads having a head chip 40B joined to a head base 40A, a rotor transformer 50 and one or more nut caps 60, the nut caps 60 being used for attaching the heads 40 onto the bottom surface 21B of the inner part 21 of the upper drum 20. The lower head drum assembly 202, on the other hand, includes a stator transformer 70, a lower drum 80 and two sets of bearings 90.

The upper drum 20 is joined with the upper part of the rotating shaft 10 via the flange 30 and the lower drum 80 is attached to the lower part of the rotating shaft 10 through the two sets of bearings 90.

Figure 3:
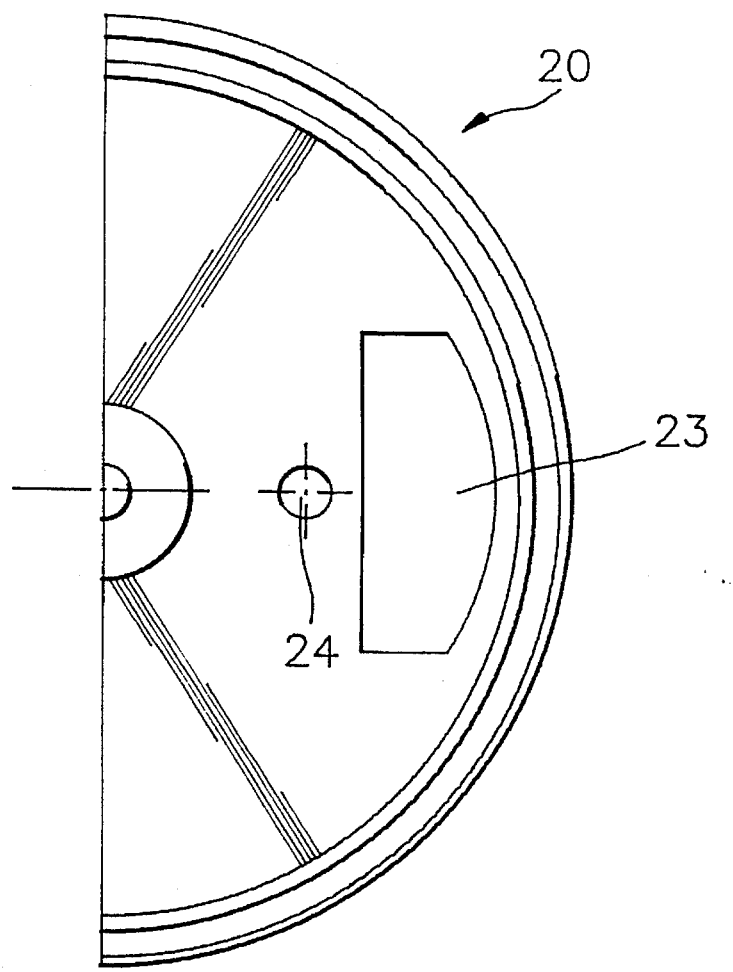
FIG. 3 illustrates a top view of half of an upper drum in accordance with the present invention.
Figure 4:
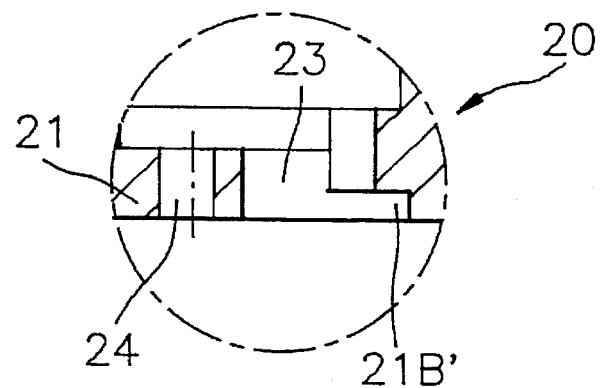
FIG. 4 offers a partially expanded cross sectional view of "a" part of FIG. 2 before mounting a nut cap and a head.

There is shown in FIG. 3 a top view of half of the upper drum 20 in accordance with the present invention showing an exemplary opening 23 and a through hole 24, the through hole 24 extending upward from the bottom surface 21B to the top surface 21A of the inner part 21 thereof. In addition, as shown in FIG. 4, an exemplary recess 21B' is provided on the bottom surface 21B of the inner part 21.

The rotor transformer 50 may be attached at a bottom part of the flange 30 using, e.g., a bonding agent. The stator transformer 70 for producing a predetermined electric signal, on the other hand, may be fixed inside the lower drum 80 using, e.g., a bonding agent, at a predetermined distance from the rotor transformer 50.

Each of the nut caps 60 for attaching said each of the heads 40 is divided into a fixed part 61, a body part 62 with an outer side surface and a stepped part 63. As used herein, the fixed part 61, the body part 62 and the stepped part 63 refer to a part of the nut cap 60 in contact with the top surface 21A of the inner part 21 of the upper drum 20, a part of the nut cap 60 fitted into the exemplary opening 23 in the upper drum 20 and a part of the nut cap 60 placed into the exemplary recess 21B', respectively.

Figure 5:
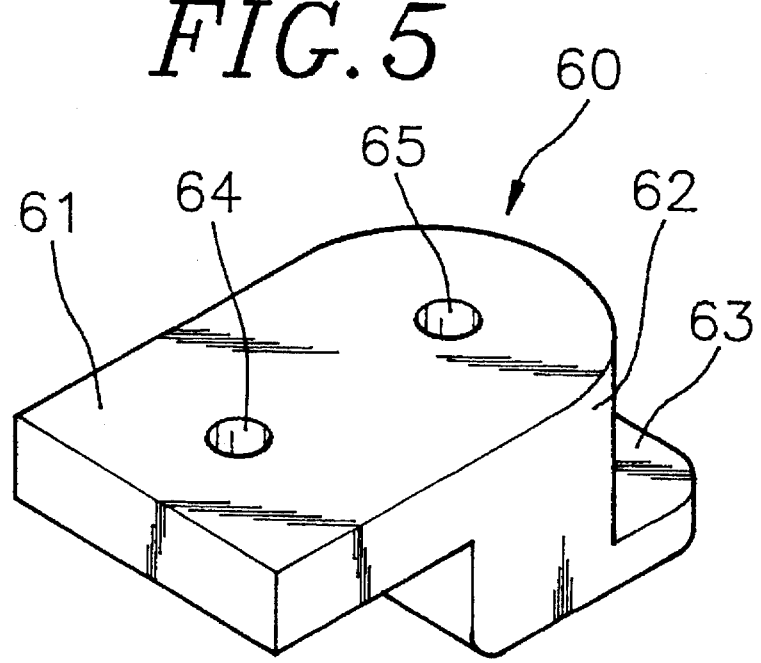
FIG. 5 represents a perspective view of a nut cap in accordance with the present invention.

As shown in FIG. 5, the fixed part 61 in each of the nut caps 60 is provided with a first tapped hole 64, the first tapped hole 64 passing through the fixed part 61. The body part 62 is provided with a second tapped hole 65, the second tapped hole 65 passing through the body part 62. The outer side surface of the body part 62 has a curvature matching the exemplary opening 23 so as to be easily inserted thereinto. Furthermore, the first and the second tapped holes 64, 65 are provided with a first and a second screws (S),(S'), respectively.

The fastening process of the head 40 to the bottom surface 21B of the inner part 21 of the upper drum 20 will now be described in detail.

One of the heads 40 is secured to the bottom surface 21B of the inner part 21 of the upper drum 20 by inserting and tightening the first screw (S) into one of the through holes 24 in the upper drum 20 and the first tapped hole 64 in the fixed part 61 on one of the nut caps 60 in such a way that the head chip 40B from the head 40 protrudes past the outer side surface 22 of the upper drum 20 through one of the head windows. Then, the vertical position of the head chip 40B within the head drum assembly 200 is adjusted by adjusting the second screw (S') inserted into the second tapped hole 65 on the corresponding nut cap 60.

In the inventive head drum, since each of the heads is securely fastened to the bottom surface of the inner part of the upper drum by inserting the first screw into the first tapped hole in the fixed part of the nut cap and the through hole in the upper drum and the vertical position of the head chip is adjusted by adjusting the second screw inserted into the second tapped hole on the corresponding nut cap, there is a lesser degree of force acting on the inner part of the upper drum, minimizing the chance of deformation of the inner part and stabilizing the head chips to maintain their vertical positions within the head drum assembly.

Although the invention has been shown and described with respect to the preferred embodiments, it will be understood by those skilled in the art that various changes and modifications may be made without departing from the scope of the invention as defined in the following claims.

What is claimed is:

1. An upper drum assembly for use in a video cassette recorder, comprising:

a rotating shaft;

a flange;

one or more heads, each of the heads having a head chip adjoined to a head base;

an upper drum adjoined to the rotating shaft via the flange and provided with an inner part having top and bottom surfaces, the inner part having one or more openings, one or more through holes, and one or more recesses on the bottom surface thereof;

one or more nut caps, each of the nut caps including a fixed part provided with a first tapped hole to be aligned with one of the through holes in the upper drum, a body part provided with a second tapped hole and an outer side surface, and a stepped part;

one or more first screws, each of the first screws matching the first tapped hole in the fixed part on one of the nut caps and one of the through holes on the inner part of the upper drum; and one or more second screws, each of the second screws matching the second tapped hole in the body part on one of the nut caps, wherein said head drum assembly is characterized in that: at least one of the heads is secured onto the bottom surface of the inner part of the upper drum with the vertical position of the corresponding head chip being precisely adjusted by fitting the body part in one of the nut caps into one of the openings on the inner part of the upper drum, placing the fixed part in the nut cap on the top surface of the inner part of the upper drum, fitting the stepped part in the nut cap into the corresponding recess on the bottom surface of the inner part of the upper drum, fastening one of the first screws upward from the bottom surface of the inner part of the upper drum through the first tapped hole of the fixed part in the nut cap and one of the through holes formed on the inner part of the upper drum, and fastening one of the second screws downward from the top surface of the body part on the nut cap through the second tapped hole thereon.

2. The upper head drum assembly of claim 1, wherein the outer side surface of the body part has a curvature matching one of the openings provided on the inner part of the upper drum.

* * * * *